United States Patent

Parsons

[15] 3,696,366
[45] Oct. 3, 1972

[54] GROUND DETECTOR SYSTEM HAVING FAST RESPONSE AND DECOUPLING OF DETECTOR CIRCUIT

[72] Inventor: Charles H. Parsons, Monroe, Conn.

[73] Assignee: Edwards Company, Inc., Norwalk, Conn.

[22] Filed: March 22, 1971

[21] Appl. No.: 126,813

[52] U.S. Cl............340/255, 235/92 EL, 324/140
[51] Int. Cl..............................................G08b 21/00
[58] Field of Search..340/255; 317/18 R; 235/92 EL, 235/92 ST; 324/52, 66, 51, 140

[56] References Cited

UNITED STATES PATENTS

| | | | |
|---|---|---|---|
| 1,055,018 | 3/1913 | Burnham | 340/255 UX |
| 2,700,125 | 1/1955 | King et al. | 340/255 X |
| 3,066,284 | 11/1962 | McKinley et al. | 340/255 |
| 3,076,601 | 2/1963 | Goetz | 235/92 ST |
| 3,267,458 | 8/1966 | Anderson et al. | 235/92 EL |
| 3,467,858 | 9/1969 | Burnett | 324/52 |
| 3,559,055 | 1/1971 | Thompson | 324/66 |

*Primary Examiner*—John W. Caldwell
*Assistant Examiner*—Daniel Myer
*Attorney*—Harold S. Wynn and John P. DeLuca

[57] ABSTRACT

A detector is disclosed which senses ground currents exceeding a predetermined magnitude in either one of a pair of line wires. A counter causes each line to be periodically and alternately connected to the detector for individual sensing of each line. An alarm system is provided which is responsive to a signal from the detector to generate a warning signal when a current exceeding said predetermined magnitude is sensed. The structure includes means for connecting each line to the detector and for responding to the alarm signal by decoupling the detector from the lines to thereby eliminate any contribution to the ground current which might be contributed by the presence of the detector coupled to the lines.

20 Claims, 3 Drawing Figures

GROUND DETECTOR SYSTEM HAVING FAST RESPONSE AND DECOUPLING OF DETECTOR CIRCUIT

BACKGROUND OF INVENTION

This invention relates to ground detector apparatus and in particular to a ground detector utilizing a counter for sampling the ground current of each of a pair of wires alternately for one cycle of line frequency.

Some present detectors utilize two bridge circuits containing resistors and capacitors as outlined in a patent by McKinley U.S. Pat. No. 3,066,284. In order to detect different combinations of ground at approximately the same level, it must average the current in the detector over more than one dynamic cycle. In fact, in such systems the faults themselves form one half of the bridge circuit and when a fault does occur, the impedance of the detector circuit may be effective to increase the total fault currently appreciably. It is important therefore to decrease the time of actuation of the system and the contribution of the detector to the ground fault current. Such a system would limit the duration and magnitude of the current flowing through the detector well below the threshold of perception of humans.

It is therefore an object of the present invention to provide a system which obviates one or more of the disadvantages of the described prior arrangements.

It is another object of the present invention to provide a ground detector capable of rapid alarm actuation and minimal effects on a person should he come in contact with a power wire.

SUMMARY OF INVENTION

There has been provided a detector for sensing ground currents exceeding a predetermined magnitude in a pair of power lines wherein the detector is coupled to each line alternately for individual detection of each line. An alarm means is responsive to the detector and generates a warning signal upon the occurrence of a predetermined or alarm current and the improvement includes means for each line connecting the line to the detector, responsive to the alarm means for decoupling the detector from the lines upon the occurrence of said hazardous current. Such means minimizes the contribution to the ground current occasioned by the presence of the detector.

In order to enjoy a better understanding of the present disclosure, attention is directed to the following specification taken in conjunction with accompanying drawings, the scope of which will be pointed out in the appended claims.

DESCRIPTION OF PREFERRED EMBODIMENT

In order to increase the accuracy of a ground detector system and at the same time reduce the contribution of the detector to the ground fault, it is proposed in the present disclosure that the detector limit its current after the occurrence of an alarm, set at some predetermined point, to a value far below the alarm point, and that a low impedance detector be used in order to increase the accuracy. This is a departure from the present approach which uses half of a bridge circuit for the detector while the other half of the bridge comprises the ground fault itself. The present scheme would place a low impedance alternately from each line to ground and to measure the voltage which occurs across the impedance as a measure of the ground fault current. Since this is a low impedance, the effect of any ground on the line not being measured will be more accurate. This low impedance would be the impedance as seen looking at the input of either of the lines to the detector, i.e., is the impedance to ground.

In order to comply with requirements for lower total hazard, the detector ceases to be coupled to either line once the alarm point is reached, until a predetermined longer time has elapsed. In this mode the detector is said to be shut down. As an additional safeguard, a continuous current limiting is provided which would come into play if the alarm failed to shut down the detector if this condition existed an alarm point slightly higher than the primary alarm point would cause thedetector's reference ground to be permanently disconnected by means of activating a latching relay or clearing a fuse.

Figure 1:
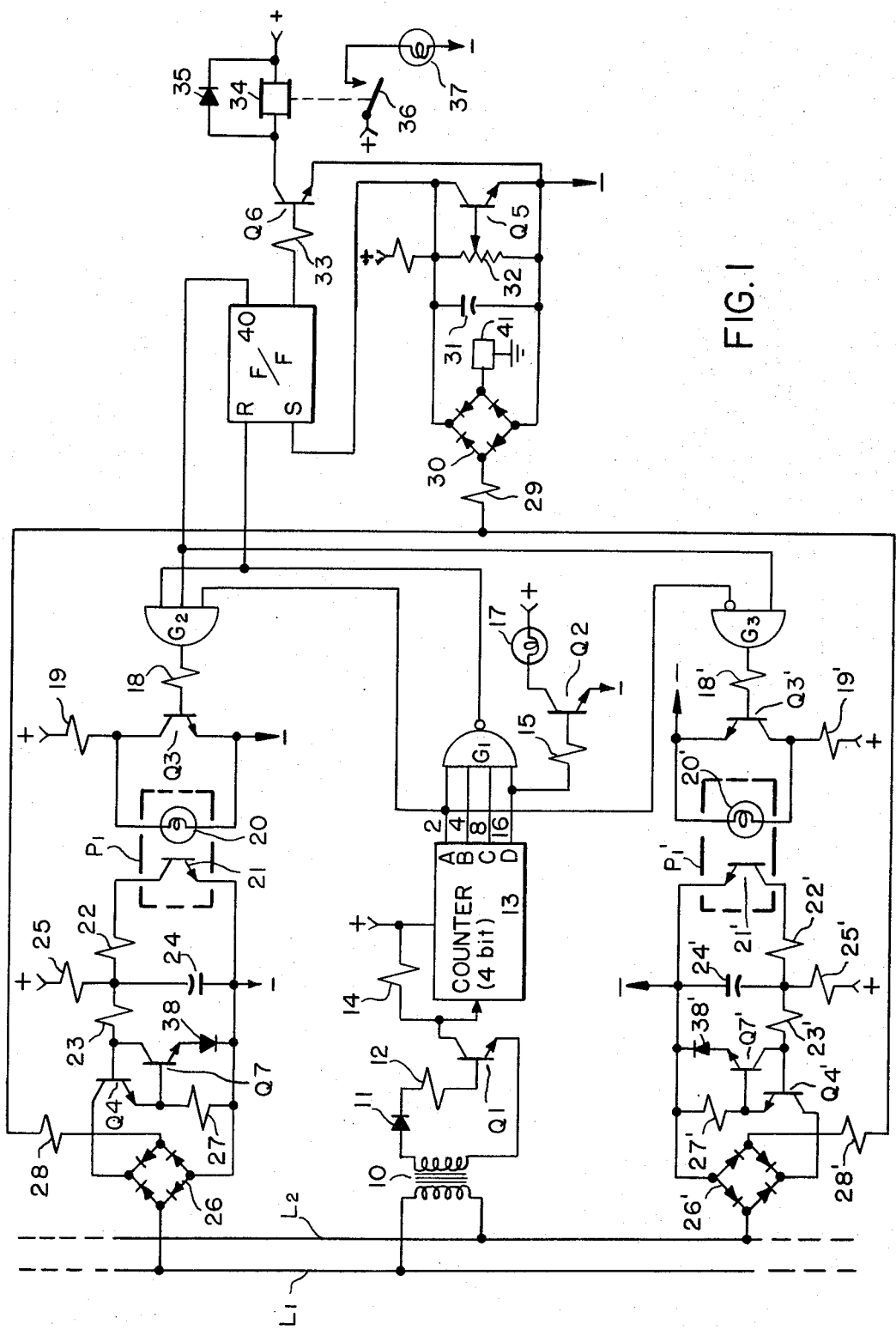
FIG. 1 of the drawings shows a partial schematic, partial block diagram of one embodiment of the present invention.

The operation of the circuit shown in FIG. 1 is as follows. A pair of current carrying wires L1 and L2 conduct power to apparatus not shown. These lines are supplied by an isolation transformer (not shown) to render them ungrounded. Such apparatus may be equipment in an operating room or intensive care area. A signal indicative of the voltage across lines L1 and L2 is coupled to a transistor Q1 through isolation transformer 10, diode 11 and resistor 12. For each positive half-cycle of the voltage on the lines a zero signal is coupled to counter 13 from the output of the transistor Q1. A positive (+) supply is coupled to the counter 13 through resistor 14 supplying one signal for each negative half cycle. The outputs of the counter 13 at A, B, C, and D divide by 2, 4, 8 and 16 respectively. That is, an output appears on output A of four-bit counter 13 for one complete cycle of the input frequency every other cycle of the input frequency. Transistor Q2 coupled to output D of counter 13 through input resistor 15 activates lamp 17 periodically in accordance with the energization of output D for indicating proper counter operation.

The output A of counter 13 is coupled to AND gate G2 while other inputs to the gate G2 are provided by gate G1 and flip-flop 40. The output of gate G1 is normally high, as is the output of flip-flop 40 when reset. For each even count of the four-bit counter 13, gate G2 is activated for producing an output through resistor 18 to the input of transistor Q3.

When transistor Q3 is off or non-conducting, a photo-coupler P1 is activated from a positive source of energy through resistor 19 and light source 20 saturating the collector-emitter junction 21 of the transistor P1. The output is coupled to the base of transistor Q4 through resistors 22 and 23. Capacitor 24 provides a time delay since it must charge before Q4 turns on. When the phototransistor P1 is activated, the bias supplied through resistor 25 is diverted to the collector-emitter junction 21 and the transistor Q4 is held cut off. When, however, an output is produced by the gate G2, transistor Q3 is activated, shunting the light source 20, cutting off the phototransistor P1 and thereby activating the transistor Q4. Current from the line L1, therefore, passes through the full-wave bridge 26, transistor Q4, output resistor 27, resistors 28 and 29 to the detector bridge 30.

Bridge 30 is coupled to transistor Q5 by capacitor 31 and potentiometer 32. The potentiometer 32 is set in accordance with the tripping value. If the current passing through the bridge 26 and imposed upon the potentiometer 32 exceeds the tripping value, transistor Q5 is activated producing an output and setting flip-flop 40. The setting of the flip-flop 40 immediately cuts off the output normally energized for activating gates G2 and G3 shunting down both sides of the detector and turns on the output for energizing transistor Q6 through resistor 33. Energization of the transistor Q6 consequently provides a current for activating relay 34. The relay 34 includes a diode 35 coupled across its coil for suppression of the back emf of the relay. The relay 34, once energized, picks contact 36 and energizes the alarm lamp 37.

The circuit including gate G3 feeding the bridge detector 30 circuit, having corresponding primed reference numerals operates similarly except that the detection or activating of the gate G3 occurs on alternate or odd cycles of the counter 13. That is, the input to the gate G3 is inverted and will provide an output to the resistor 18' when the output of flip-flop 40 is reset and the counter output A is low. Thus, each side of the lines L1 and L2 are alternately tested for ground faults on even and odd counts of the counter 13 respectively.

A circuit coupling the base and emitter circuit of transistor Q4 is provided by using the transistor 27 and diode 38 coupled between its emitter and base respectively. If the current through the transistor 24 increases beyond the anticipated alarm point, the increased current through the emitter of transistor Q4 drives the base of transistor Q7 positive causing it to conduct emitter current from transistor Q4 through the Q7 emitter-collector circuit through the diode 38 to minus. By this means the current through the transistor Q4 which flows through the bridges 26 and 30 to drive Q5 may not exceed a maximum as determined by the combination of the transistors Q4 and Q7 and R27. It can be seen from this that the transistor Q7' and diode 38' perform the same function with respect to the transistor Q4'.

It may be observed from the above mentioned configuration that the safety device 41 noted in the output circuit of the bridge 30 is set to cut out the detector from the reference ground in the event of an alarm during which the detector fails to shut down. By combining the peak current limitation provided by the transistor Q7 and the turning off of gates G2 and G3 by the alarm flip-flop 40, it can be seen that the circuit of the detector does not draw current to increase the hazard of the ground fault which already exists once the alarm point is reached. This therefore sufficiently isolates the detector from the lines L1, L2 so that the device draws ground current only before the alarm point is reached and for a short interval when the detector is periodically reconnected to the line to verify that the alarm condition still exists.

Upon the occurrence of a ground fault, indicator 37 is activated by the closure of front contact 36 of relay 34. Both sides of the detector are shut down. However, every sixteenth count of the counter 13 produces a pulse which drives the gate G1 to a condition such that its output is low thus cutting out the input to the gate G2 and resetting the flip-flop 40. It can be seen from this condition since the count is at 16 the input to the gate G3 is deactivated because it is an even count and the output of G1 is deactivated because all four inputs A through D are satisfied, thus a necessary input to both gates G2 and G3 are absent and both circuits for each line L1 and L2 are decoupled from the circuit. Under these conditions, transistor Q5 is deactivated because no ground fault current may flow through either of the bridges 26 or 26' and their respective output transistors Q4 and Q4' to drive the detector circuit including the resistor 29, bridge 30, transistor Q5, and its associated circuitry. The output pulse generated on the sixteenth count of the four-bit counter 13 resets the flip-flop 40 in the event it has been set by conduction of Q5 due to a ground fault. This resetting of the flip-flop 40 provides an output to the gate G3 for the next count (count No. 1 odd) of the counter 13. The bridge circuit detector 26' then conducts ground current through transistor Q4' due to the activation of gate G3.

If a ground fault persists, the transistor Q5 is activated setting the flip-flop 40 and activating the output relay 34. If the ground fault does not persist flip-flop 40 remains in the reset condition dropping the relay 34. Similarly, each time a ground fault occurs and persists counter 13 cycles through and causes gate G1 to reset the flip-flop 40 and activate the input to the gate G3 thus providing a means for checking the operability of the detector circuit when a ground fault occurs. If some momentary ground fault causes an energization of the relay 34, the cyclicing of the counter 13 is used to reset this condition. If the ground fault persists, relay 34 does not deenergize. This system may be used to detect ground faults in any isolated power line source over a range of frequencies. The actuation of the switching means that is the transistors of the circuit are almost instantaneous and the detection of the ground fault occurs within one cycle of the detector frequency which is two cycles of the frequency of the lines L1, L2. No averaging of ground currents over complete detector cycle need be performed because the circuit is designed to react within the cycle of line frequency, it is coupled to for detecting this fault.

The detector disclosed in the present description provides instantaneous ground fault indication, peak current limitation and checking of the detector integrity. In addition to these checks, the gates G2 and G3 are disabled by the setting of the flip-flop 40 any time a ground fault is detected so that no current may flow from the lines L1, L2 through any of the detector circuits thus essentially isolating the detector from the lines once the ground fault has been sensed. In addition, once a ground fault indication appears, the counter recouples the system to the lines for checking whether the ground fault is persistent, and if so, again the system sets the flip-flop 40 and deactivates the gates G2 and G3 so that the detector is decoupled from the lines.

A final protection for the system is the latching relay device 41 at the output of the bridge 30 which open-circuits the reference ground of the detector in the even the peak current is above some pre-selected value just higher than the alarm ground fault current.

Figure 2:
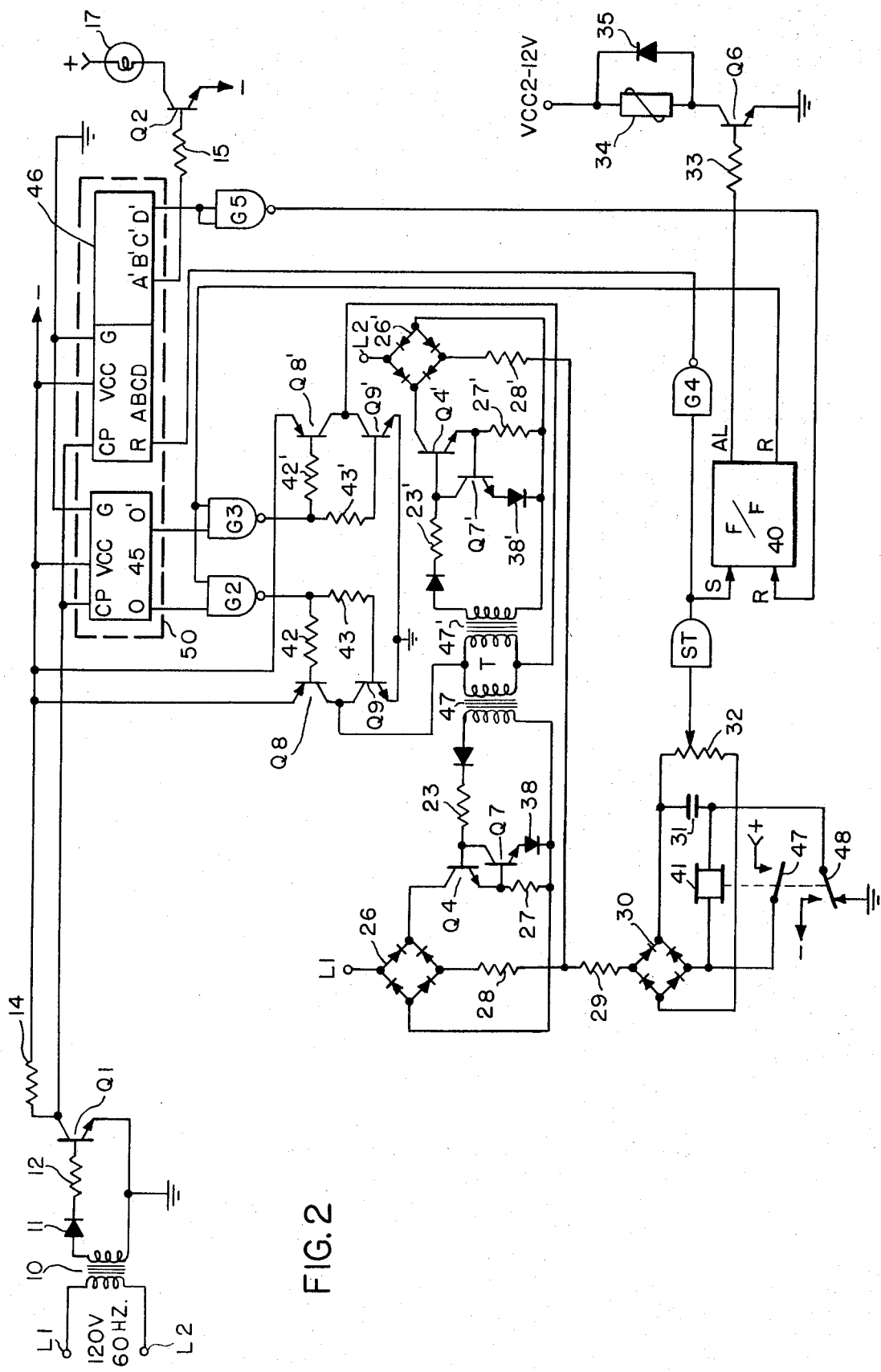
FIG. 2. shows a second embodiment using a different timing configuration.

FIG. 2 shows an alternate embodiment of the detector of the present invention using a somewhat different timing apparatus. The reference numbers are repeated in FIG. 2 for those elements which have corresponding functions as previously described for FIG. 1.

In this embodiment, the counter 50 is driven by the clock including transistor Q1. For each cycle of input frequency the counter 50 is stepped once. The counter 50 includes a one stage counter 45 has two outputs; 0 and 0' for driving respectively gates G2 and G3 on alternate cycles of the input frequency. Gates G2 and G3 are coupled respectively to transistor networks including transistors Q8, Q9 and resistors 42, 43 and Q8', Q9' and 42', 43' respectively. This transistor network for the gate G2 generates an alternating square wave signal which is half the frequency of the input or line frequency to the primary of transformers 47 and 47'. The output of gate G2 is low. Transistor Q8 will be energized. Since this means that the output of gate G3 is high, transistor Q9' would also be energized. The energy path through the primary of the transformers then is through transistor Q8 to one side of the primary and from the other side through Q9' to ground. During the alternate one-half cycle, Q8' and Q9 would be energized thus producing an alternating current. If the secondaries of the transformer 47, 47' are connected opposite in phase, the base drive will be given to transistors Q4 and Q4' respectively on alternate cycles of the input line frequency. It should be noted that the transformer T is used in a similar manner to the photodiodes P1 and P1' of FIG. 1 for isolating the power line coupling from the counter. The configuration of the alarm relay 34 is similar to that of the circuit shown in FIG. 1. A variation from the circuit includes the Schmitt trigger ST for generating the alarm pulse, although the transistor Q5 shown in FIG. 1 and its associated circuitry would function adequately to provide this energy signal. The output of the Schmitt trigger ST is coupled to flip-flop 40 and also to gate G4 which is used to reset the multi-stage counter 46.

As the input frequency signal steps counter 45, it similarly steps multi-stage counter 46. The purpose of the counter 46 is to generate a reset pulse at its last output D' through the gate G5 for resetting flip-flop 40. When, however, an alarm signal is generated by the Schmitt trigger ST which sets the flip-flop 40 for activating the alarm relay 34, another reset signal is sent to the counter 46 over the gate G4. When the flip-flop 40 is set, an input to each gate G2 and G3 is deactivated, thus decoupling the detector from the lines L1, L2 as described previously for FIG. 1. At the same time, a reset pulse is generated over gate G4 for resetting the counter 46 to zero. It should be noted that the output of gate G5 would be high and thus no reset pulse for the flip-flop 40 is produced until the counter 46 counts up a sufficient number of pulses to produce an output at D'. By resetting the counter 46 to zero, and opening gates G2 and G3, at the same time that the alarm flip-flop 40 is set, the counters 45 and 46 are synchronized such that when the counter 46 energizes gate G5 to reset flip-flop 40. the counter 45 is producing a pulse on its output 0 or 0' in accordance with the respective line L1 or L2 which was responsible for the activation of the alarm relay 34. In this way, the detector is re-coupled to the lines L1 and L2 on a cycle of the counter 45 which is associated with the line which caused the ground fault. The advantage of this system is that the detector will not look for a complete cycle at the line which did not give the alarm before.

It is intended that the detector check the faulty line which caused the ground fault to occur initially. If the fault no longer exists, the counter will continue to operate normally until such time as the ground fault may again occur at which time the trigger ST will set the flip-flop fully and gate G4 for resetting the counter 46 and cut off gates G2 and G3 again.

The low impedance characteristic of the system as described previously consists of the impedance represented by the bridge circuits 26–26' and 30 in either embodiment, plus the series impedance to ground represented by the various resistors and switching devices coupled to them, for example, transistors Q4–Q4', resistors 28–28' and 29. These impedances are very low and therefore provide a system which is quick to respond to the alarm situation to be monitored.

Figure 3:
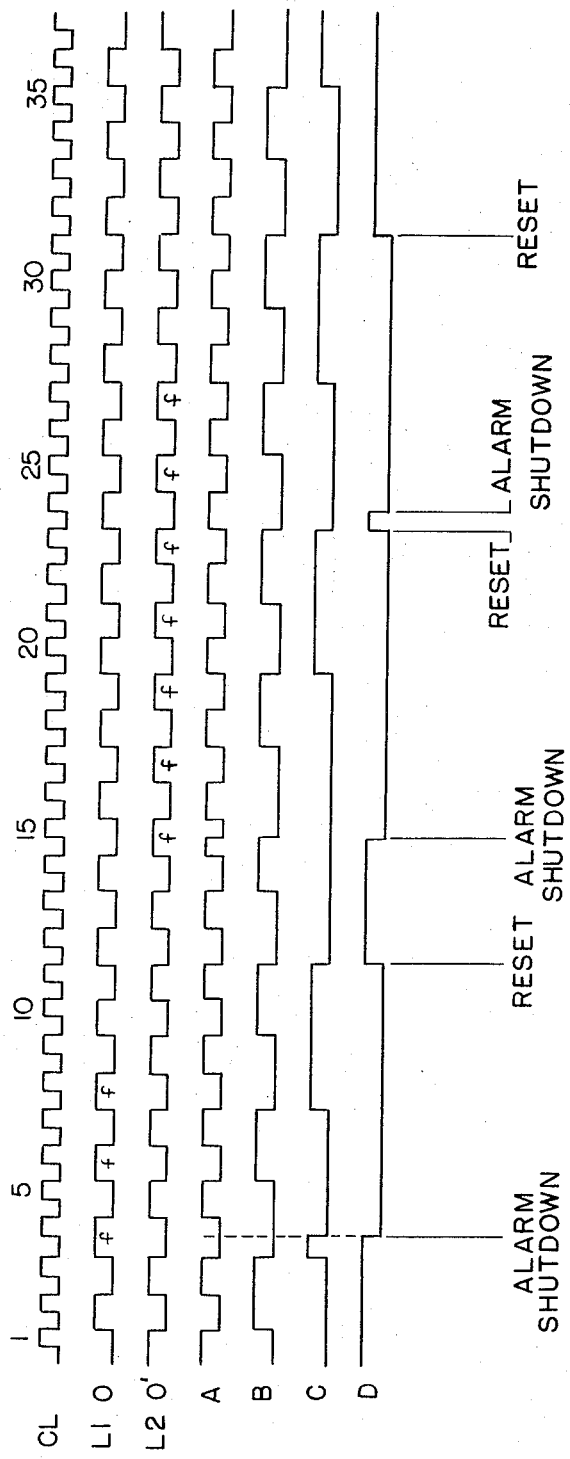
FIG. 3 is a chart for a four stage counter which shows the principle of operation of the timing of the invention.

FIG. 3 is a chart for a four stage counter which shows the principle of operation of the timing of the system. It is to be understood that the present system utilizing eight stage counter 46 would operate in the same manner except the delay before reset would be longer. In accordance with FIG. 3 it can be appreciated that a ground fault $f$ appears during clock pulse No. 4. This causes shutdown and reset of the four bit counter represented by outputs A, B, C, and D going to zero. Output A will go high when clock pulse No. 4 ends. Note that output B will go high at the end of clock pulse No. 5. This is just prior to 0 going high. If the alarm flip-flop 40 were reset by B going high, the alarm would immediately be seen. Note that if the alarm flip-flop 40 were reset when C does high, it will also be just prior to 0 going high. The same will be true for output D, A', B', C', D'. In the actual circuit, D' is chosen because it gives a longer delay. This first example shows what would happen if the alarm goes away before reset. The reset occurs at the end of clock pulse No. 11 when D goes high and no new alarm occurs.

A fault current coincident with 0' being high occurs in clock pulse No. 15. All outputs A, B, C D are forced to zero and output A goes high again at the end of clock pulse No. 15. Now observe that output B goes high at the end of clock pulse No. 16 just prior to 0' going high. The output C goes high at the end of clock pulse No. 18, also just prior to 0' going high. The reset of the alarm flip-flop 40 when output D goes high is also just prior to 0' going high and the alarm 34 is immediately reinstated and counting resumed. The reset at the end of clock pulse No. 30 has no other effect since the alarm 34 has cleared.

In each case the output A adjusted itself to be out of phase with the output of 1 bit counter 45 which was high at the time the alarm was detected.

With regard to the relay 41 shown in FIG. 2, the bridge detector 30 is coupled to ground through the coil of relay 41 over back contact 48. If the current of the detector 30 is in excess of predetermined values generally higher than the anticipated ground fault currents, the relay 41 is energized closing front contact 48 which supplied a positive (+) potential to bridge 30 and its associated circuitry including resistor 32 and trigger ST so as to simulate a ground fault. This serves two purposes. It isolates the system from ground by opening back contact 48 and provides a signal indicative of a ground fault in addition to the signals provided through bridge circuits 26–26'. Thus, the detector is decoupled from the lines because the bridge detector 30 has been deactivated and the trigger ST generates a pulse for triggering the alarm relay Q6 through the flip-flop 40.

There has therefore been provided a detector for sensing ground currents of a hazardous nature wherein the detector is coupled to the lines alternately for each alternate step of a counter. The detector generates the warning signal upon the occurrence of such hazardous current and the improvement includes means for decoupling both lines from the detector upon the occurrence of the ground current thus eliminating any contribution to the ground currents occasioned by the presence of the detector coupled to the lines. Other means including peak current limitation and recoupling means for checking the integrity of the detector are provided as part of the system to point out the improvements of the present disclosure.

While there has been provided what is at present considered to be the preferred embodiment of the invention, it will be obvious to those skilled in the art that various changes and modifications may be made therein without departing from the invention, and it is intended in the appended claims to cover all such changes and modifications as fall within the true spirit and scope of the invention.

What is claimed is:

1. A detector for sensing ground currents which exceed a predetermined magnitude in either one of a pair of power lines wherein a counter couples each line alternately to the detector for individual sensing of each line, and alarm means coupled to the detector for generating a warning signal in response to the detection of a ground current exceeding said predetermined magnitude wherein the improvement comprises:

control means for selectively connecting each line to the detector, and responsive to the alarm means for decoupling the detector from the lines upon the detection of a current exceeding said predetermined magnitude to eliminate any contribution to the sensed ground currents occasioned by the coupling of the detector to said lines.

2. The detector as described in claim 1 wherein the detector exhibits a characteristic impedance having a magnitude substantially less than anticipated ground fault impedances for fast accurate ground fault detection.

3. The detector as described in claim 1 and further comprising: recoupling means responsive to the counter for recoupling the detector to the lines such that the detector may periodically test for continuation of a ground current exceeding said predetermined magnitude.

4. The detector as described in claim 3 wherein said recoupling means is periodically activated each time the counter reaches a predetermined count, and wherein said detector is responsive thereto for reestablishing said warning signal upon detection of a ground current exceeding said predetermined magnitude.

5. The detector as described in claim 4 wherein said recoupling means comprises: NAND gate means operative for producing an output signal in response to said predetermined count of said counter.

6. The detector as described in claim 1 and further comprising: switching means responsive to a potential indicative of a ground current exceeding said predetermined magnitude for activating said alarm means.

7. The detector as described in claim 6 wherein said switching means comprises: a transistor which is rendered conducting when the magnitude of said potential is indicative of a ground current exceeding said predetermined magnitude.

8. The detector as described in claim 7 wherein said alarm means includes: bistable means, responsively coupled to the switching means, and having first and second conductance states, for producing first and second output signals indicative of normal and alarm conditions, respectively.

9. The detector as described in claim 8 wherein said bistable means comprises: a solid state bistable multivibrator.

10. The detector as described in claim 8 wherein said alarm means further includes: a device coupled to the bistable means and normally controlled by said first conductance state for providing an indication of the normal condition; and activated for providing a warning signal when said bistable means is in said second conductance state.

11. The detector as described in claim 1 wherein said counter comprises: a four bit counter coupled to the pair of power lines for producing odd and even output pulses in response to signals indicative of alternate cycles of power applied to said pair of lines.

12. The detector as described in claim 11 wherein said control means includes: at least first and second AND gate means coupled to the counter and having inputs derived from the even and odd outputs of said counter respectively, each of said first and second gates alternately activated by said counter outputs and deactivated in response to the sensing of ground currents exceeding said predetermined magnitude for decoupling said detector from said pair of lines.

13. The detector as described in claim 1 wherein said detector further comprises: a bridge rectifier and transistor switching means coupled thereto for each line, each of said transistors being activated in response to alternate counts of said counter for conducting current signals from said bridge rectifier, and a voltage divider means coupled to the outputs of the transistor switching means for producing a potential indicative of the magnitude of said current signals, and wherein said alarm means is activated when the potential exceeds a level indicative of a ground current exceeding said predetermined magnitude.

14. The detector as described in claim 1 wherein said counter comprises: a one stage counter having an output for each line responsive to the line frequency for producing an output signal; and a multi-stage counter having a number of output leads and which produces a reset signal on one of its output leads.

15. The detector as described in claim 14 and further including: AND gate means coupled to each output of the one stage counter and gated with counter; output of the alarm means such that each AND gate means alternately and selectively energizes the detector for its associated line.

16. The detector as described in claim 15 and further including: alarm reset means for the alarm means activated by the last stage of said multi-stage counter, and counter reset means activated in response to the alarm signal for resetting the multi-stage counter to zero counts; whereby the single stage counter is synchronized with the multi-stage counter for checking the line on which an alarm occurred first so that the detector has minimal influence on the ground fault current.

17. The detector as described in claim 1 and which further includes: auxiliary decoupling means for each line responsive to a level of ground current higher than said predetermined magnitude for decoupling said detector from said line.

18. The detector as described in claim 17 wherein said auxiliary decoupling means comprises: a transistor for limiting the sensed ground current signal to less than a predetermined overload current just higher than said predetermined magnitude.

19. The detector as described in claim 17 wherein said detector further include: a phototransistor means for selectively coupling the detector to the line, when activated by alternate opposite outputs of the counter.

20. The detector as described in claim 17 and which further includes: a transformer having two secondaries wound out of phase one with the other for coupling, when activated by alternate opposite outputs of the counter, each associated line to the detector.

* * * * *